United States Patent [19]

Dupont et al.

[11] Patent Number: 5,104,272
[45] Date of Patent: Apr. 14, 1992

[54] METHOD OF INSTALLING AS FASTENER IN A SUPPORT MADE OF MOULDED SOFT MATERIAL, FASTENER SUITABLE FOR IMPLEMENTING THIS METHOD, FIXING INCORPORATING SAID FASTENER, AND SUPPORT MADE OF MOULDED SOFT MATERIAL OBTAINED BY SAID METHOD

[75] Inventors: Christian Dupont, Andresy; Pierre Guillon, Taverny, both of France

[73] Assignee: ITW De France, Beauchamp, France

[21] Appl. No.: 617,335

[22] Filed: Nov. 23, 1990

[30] Foreign Application Priority Data

Feb. 9, 1990 [FR] France .................. 90 01532

[51] Int. Cl.⁵ .............................................. F16B 21/00
[52] U.S. Cl. .................................. 411/339; 411/178; 411/510; 24/297
[58] Field of Search ............... 411/378, 178, 180, 395, 411/403, 500, 508, 509, 510, 339, 338; 24/297, 290

[56] References Cited

U.S. PATENT DOCUMENTS

| | | | |
|---|---|---|---|
| 638,326 | 12/1899 | Farr .......................... | 411/178 X |
| 3,081,808 | 3/1963 | Rosan et al. ............... | 411/178 |
| 3,911,781 | 10/1975 | Bapport ..................... | 411/178 X |
| 4,601,625 | 7/1986 | Ernst et al. ................ | 411/395 X |
| 4,760,843 | 8/1988 | Fischer et al. ............. | 411/178 X |
| 4,797,983 | 1/1989 | Barnett et al. ............. | 24/297 |
| 4,861,208 | 8/1989 | Boundy ....................... | 411/908 X |
| 4,892,429 | 1/1990 | Giannuzzi ................... | 411/395 X |

FOREIGN PATENT DOCUMENTS

| | | | |
|---|---|---|---|
| 716817 | 8/1965 | Canada ...................... | 411/178 |
| 1098291 | 3/1981 | Canada ...................... | 411/509 |
| 1575180 | 1/1970 | Fed. Rep. of Germany ...... | 411/178 |

Primary Examiner—Rodney M. Lindsey
Attorney, Agent, or Firm—Schwartz & Weinrieb

[57] ABSTRACT

A two-part fastener for mounting a component upon a substrate comprises a first part having an elongate hollow body, a self-tapping threaded portion defined upon an exterior peripheral portion of the elongate body whereby the first part can be threadedly secured within the substrate, and a first snap-fitting engagement member defined upon an internal peripheral portion of the first part. The second part likewise comprises an elongate body, a support portion for fixedly mounting the component thereon, and a plurality of axially spaced second snap-fitting engagement members defined upon an external peripheral portion of the second part. When the second part is axially inserted into the first part, for example, with the component affixed thereon, the second snap-fitting engagement members of the second part selectively engage the engagement member of the first part such that the disposition of the component supported upon the second part can be adjustably mounted as desired relative to the substrate.

10 Claims, 1 Drawing Sheet

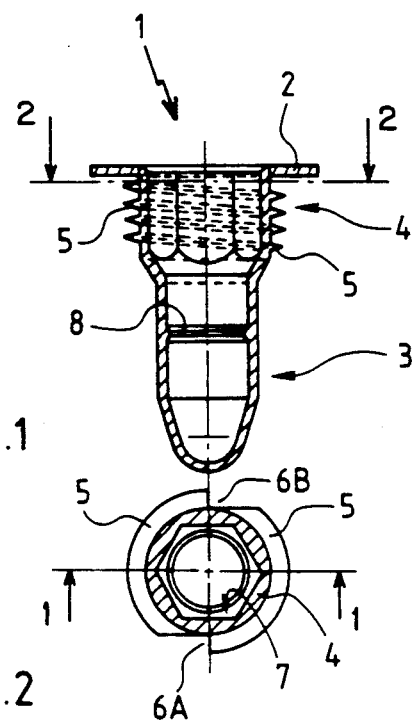
Fig.1
Fig.2
Fig.3
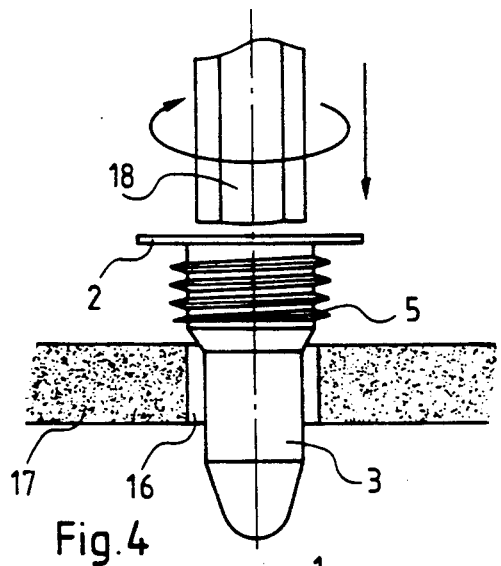
Fig.4
Fig.5
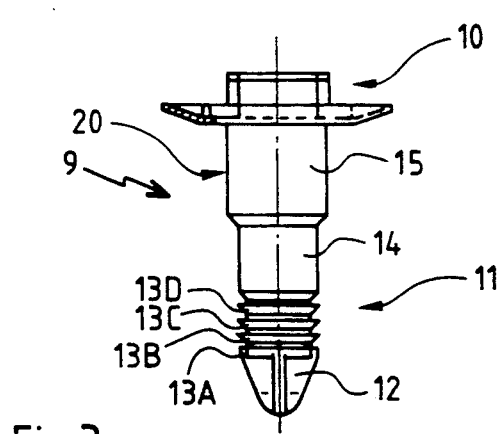
Fig.7
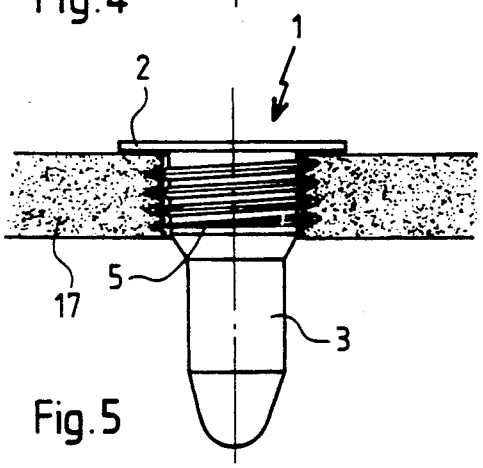
Fig.6

METHOD OF INSTALLING AS FASTENER IN A SUPPORT MADE OF MOULDED SOFT MATERIAL, FASTENER SUITABLE FOR IMPLEMENTING THIS METHOD, FIXING INCORPORATING SAID FASTENER, AND SUPPORT MADE OF MOULDED SOFT MATERIAL OBTAINED BY SAID METHOD

FIELD OF THE INVENTION

The invention concerns the installation of fasteners within a support made of a molded soft material, such as, for example, a foam panel.

BACKGROUND OF THE INVENTION

Fasteners of the aforenoted type are installed within the supports during manufacture by means of a process of overmolding so as to provide the supports with strong fastening means, which usually enable demounting of the fasteners without damage to the panel, it being impossible to obtain such fastening means directly within the molded soft materials.

The installation of fasteners by means of the aforenoted overmolding process is entirely satisfactory as it results in excellent retention of the fastener within the soft material. Nevertheless, the invention is directed to improving the installation of the fasteners.

SUMMARY OF THE INVENTION

To this end it proposes a method of installing a fastener within a support made of molded soft material characterized in that the fastener has a self-tapping screwthread upon the external side wall and is screwed into a prepared hole defined within the support.

This manner of installing the fastener unexpectedly achieves an entirely satisfactory retention of the fasteners within the support; it is particularly advantageous in that it is cheaper and easier to implement than overmolding, in particular because it avoids the problems of placing the fasteners within the mold.

In order to carry out the installation under the best possible conditions, the fastener is preferably threadly engaged within the hole until a bearing head that it comprises is in abutting relationship with the support and/or a predetermined tightening torque level is reached.

In accordance with a second aspect, the invention concerns fasteners having a self-tapping screwthread up the external side wall and which are adapted to be installed into a support in order to provide it with fastening means by means of which the support may subsequently be fastened to another member.

Known fasteners of this type are all made of steel as they are designed to be installed within materials such as, for example, concrete or plastic materials, that is to say within relatively hard materials.

The fastener in accordance with the present invention is characterized in that it is molded from a plastic material.

The plastic material generally has sufficient hardness such that the fastener made therefrom is able to cut a screwthread within the molded soft material, the fastener in accordance with the invention being particularly economical in that it is molded.

In accordance with a third aspect, the invention also concerns supports obtained by means of the method in accordance with the invention and in particular supports in which a fastener in accordance with the invention has been installed.

In accordance with a fourth aspect, the invention concerns a fixation system comprising two fasteners, a first fastener in accordance with the invention and a second fastener adapted to cooperate with the first fastener.

Preferably, the first fastener comprises female fastening means and the external surface of the second fastener which is at the level of the self-tapping screwthread when the fixation system is assembled mates with the internal surface of the first fastener which is disposed at this level.

A fixation system of this kind has the advantage of particularly secure retention within the support, while deformation of the first fastener is prevented at the level of the self-tapping screwthread by means of the cooperation of the internal and external surfaces.

BRIEF DESCRIPTION OF THE DRAWINGS

The description of the invention will now continue with the description of two embodiments described hereinafter by way of non-limiting illustrative examples only and with reference to the appended drawings, in which like reference characters designate like or corresponding parts throughout the several views, and wherein:

FIG. 1 shows a fastener in accordance with the invention in cross-section as taken along the line 1—1 in FIG. 2;

FIG. 2 is a cross-sectional view of the fastener of FIG. 1 as taken along the line 2—2 in FIG. 1;

FIG. 3 shows a second fastener adapted to cooperate with the fastener shown in FIGS. 1 and 2 so as to form a fixation system in accordance with the invention;

FIG. 4 shows the fastener being installed within a molded panel;

FIG. 5 shows the fastener installed within the panel;

FIG. 6 shows the assembled fixation system, the second fastener carrying a member to be secured to the panel; and FIG. 7 shows in the same way as FIG. 5 an alternative embodiment of the fastener.

DETAILED DESCRIPTION OF THE INVENTION

The fastener 1 is made of a molded plastic material, such as, for example polyuretal. It is generally nipple-shaped with a flange 2 at a first end, a teat 3 at the other end and a body 4 between the flange and the teat.

The outside lateral surface of the body 4 carries a self-tapping screwthread 5 which incorporates two self-tapping grooves 6A and 6B; the inside lateral surface 7 of the body 4 has a hexagonal cross-section; a circular bead 8 projects from the inside wall of the teat 3.

The second fastener 9 is also made from a molded plastic material. It comprises a head 10 provided with means for mounting a member to be fixed, a foot 11 having a cruciform cross-section conical end part 12 followed by notches 13A through 13D and a cylindrical portion 14, and a body 15 of larger diameter than the portion 14, located between the head 10 and the foot 11.

A hole 16 is made within the foam panel 17 so as to install the fastener 1, its diameter being substantially equal to the root diameter of the screwthread 5.

The teat 3 end of the fastener 1 is inserted into the hole 16 until the screwthread 5 comes into contact with the panel 17 and to complete installation a rotary tool 18 is used, the end of which is brought into contact with the surface 7 with which it is adapted to cooperate. As the fastener 1 is screwed into the panel 17, the self-tapping screwthread 5 digs into the wall of the hole 16 and this screwing operation is continued until the flange 2 bears against the panel 17, as shown in FIG. 5. This completes the installation of the fastener within the panel 17.

The self-tapping grooves 6A and 6B are beneficial given the nature of the material of the panel 17, but for other supports made from molded soft material a single groove may be sufficient or the grooves may even be eliminated.

Good results are obtained by screwing in the fastener 1 "by feel", but it is nevertheless preferable to determine a tightening torque level enabling the fastener 1 to be tensioned sufficiently the risk of damaging the thread cut into the foam and to terminate the screwing when this predetermined torque is reached, such as, for example by mounting the tool 18 upon a rotary device that is disengaged when the predetermined torque level is reached.

In order to fix the member 19 to the panel 17 the second fastener 9 is mounted within it, using the means provided within its head 10, and the end 12 of the fastener 9 is inserted into the fastener 1 until the notch 13A meets the bead 8; slight force is applied to deform the teat 3 so that at least one of the notches 13A through 13 D is pushed beyond the bead 8 and the latter is accommodated within the notch above the last notch which has gone past the bead 8 (the notch 13C in FIG. 6), so that the fasteners 1 and 9 are snap-fastened together.

When the notches 13A through 13D are at the level of the bead 8, the body 15 is at the level of the body 4 and the external surface 20 of the body 15 has just been fitted into the surface 7, which offers the advantage of supporting the fastener 1 at the level of the screwthread 5, which is favorable to the retention of the fastener 1 within the panel 17, and in particular the durability of such retention, the familiar deformation of plastic materials as a result of creep being prevented in the first fastener at the level where it is attached to the material of the panel.

The shape of the notches 13A through 13D and that of the bead 8 are designed to allow disengement of the fastener components depending upon the circumstances in which the fasteners 1 and 9 are used, but it is naturally possible to provide many other kinds of snap-fastening means between the fasteners forming the fixation system, and even a screwthread type cooperation as with the member 30 shown in FIG. 7, which is similar to the member 1 but which has no teat 3, is practical, its body 34 having a screwthreaded bore 35 under the surface 7.

The members 1 and 30 each comprise a flange 2 so that installation can be completed under the optimum conditions, but in simplified embodiments it is possible to dispense with the flange and the bearing head.

The shape of the ends of the member 1 is advantageous in that it makes it possible to achieve a complete seal: the head 2 which bears upon the panel prevents liquid or dust from passing to the exterior of the member 1 while the closed end of the teat 3 prevents ingress through the interior of the member 1. The head 2 can be made convex and deformable so that it is flattened against the panel 17 at the end of the installation process so as to favor this sealing effect.

Finally, male fastening means instead of female fastening means may be provided within the installable fastener.

Of course, the invention is not limited to the embodiments described and shown but to the contrary encompasses any variant therefore that might suggest itself to those skilled in the art. It is therefore to be understood that within the scope of the appended claims, the present invention may be practiced otherwise than as specifically described herein.

We claim:

1. A two-part fastener for mounting a component upon a substrate, comprising:
   a first part having an elongate hollow body;
   self-tapping thread means defined upon an exterior peripheral portion of said first part for threadedly securing said first part within said substrate;
   first snap-fitting engagement means defined upon an internal peripheral portion of said first part;
   a second part having an elongate body capable of being inserted within said elongate hollow body of said first part;
   means defined upon said second part for affixing said component upon said second part; and
   a plurality of axially spaced second snap-fitting engagement means defined upon an external peripheral portion of said second part for selectively engaging said first snap-fitting engagement means of said first part in order to adjustably mount said second part upon said first part in order to adjustably position said component relative to said substrate.

2. A fastener according to claim 1, further comprising:
   a bearing head (2) integrally formed upon an upstream end of said first part for engagement with a surface of said substrate when said first part is fully threadedly secured within said substrate.

3. A fastener as set forth in claim 2, wherein:
   said self-tapping thread means of said first part is disposed upon said exterior peripheral portion of said first part at an axial location immediately downstream of said bearing head.

4. A fastener as set forth in claim 3, further comprising:
   rotary engagement means, defined upon an internal portion of said hollow elongate body of said first part at an axial location corresponding to said axial location of said self-tapping thread means formed upon said exterior peripheral portion of said first part, for receiving a rotary tool therewithin by means of which said first part of said fastener can be threadedly secured within said substrate.

5. A fastener as set forth in claim 4, wherein:
   said rotary engagement means comprises a socket defined within said first part of said fastener.

6. A fastener as set forth in claim 5, wherein:
   said socket has a polygonal cross-section.

7. A fastener as set forth in claim 6, wherein:
   said polygonal cross-section comprises a hexagon.

8. A fastener according to claim 2, wherein:
   said hollow elongate body of said first part is closed at a downstream end of said hollow elongate body so as to prevent the ingress of environmental matter into said hollow elongate body of said first part.

9. A fastener according to claim 8, wherein:
   said first part of said fastener is nipple-shaped.

10. A fastener as set forth in claim 1, wherein:
    said first and second parts of said fastener comprise molded plastic components.

* * * * *